(12) United States Patent
Druml (10) Patent No.: US 11,938,955 B2
(45) Date of Patent: *Mar. 26, 2024

(54) ADVANCED DRIVER ASSISTANCE SYSTEMS TEST-INTERFACE FOR AUTOMATED DRIVING SENSORS

(71) Applicant: Infineon Technologies AG, Neubiberg (DE)

(72) Inventor: Norbert Druml, Graz (AT)

(73) Assignee: Infineon Technologies AG, Neubiberg (DE)

( * ) Notice: Subject to any disclaimer, the term of this patent is extended or adjusted under 35 U.S.C. 154(b) by 80 days.

This patent is subject to a terminal disclaimer.

(21) Appl. No.: 17/367,724

(22) Filed: Jul. 6, 2021

(65) Prior Publication Data

US 2021/0331688 A1  Oct. 28, 2021

Related U.S. Application Data

(63) Continuation of application No. 15/934,041, filed on Mar. 23, 2018, now Pat. No. 11,091,169.

(51) Int. Cl.
*B60W 50/02* (2012.01)
*B60W 30/12* (2020.01)
(Continued)

(52) U.S. Cl.
CPC ........ *B60W 50/0205* (2013.01); *B60W 30/12* (2013.01); *G01S 7/497* (2013.01);
(Continued)

(58) Field of Classification Search
CPC ....... B60W 50/0205; B60W 2050/021; B60W 2050/0215; G01S 7/497
See application file for complete search history.

(56) References Cited

U.S. PATENT DOCUMENTS 5,726,887 A * 3/1998 Spies ................. B60R 21/0173
701/29.1
5,748,505 A    5/1998 Greer
(Continued)

FOREIGN PATENT DOCUMENTS

DE      102014107689 A1    12/2014
WO        2017069695 A1     4/2017

*Primary Examiner* — Jelani A Smith
*Assistant Examiner* — Toya Pettiegrew
(74) *Attorney, Agent, or Firm* — Harrity & Harrity, LLP (57) ABSTRACT

An object sensor test system includes a sensor and a test bench. The sensor includes a receiver configured to receive a simulated optical signal and a processing chain that includes a plurality of processing components configured to process at least one measurement signal generated in response to the simulated optical signal to generate processed test data. The sensor also includes a test interface configured to receive a control signal, and selectively extract processed test data at a selected output of the processing chain based on the control signal. The test bench is configured to transmit the control signal to the test interface, receive the processed test data from the sensor, compare the received processed test data with expected data to generate a comparison result, and determine that a segment of the processing chain is operating normally or abnormally based on the comparison result.

21 Claims, 6 Drawing Sheets

(51) Int. Cl.
*G01S 7/497* (2006.01)
*G01S 13/86* (2006.01)
*G01S 13/931* (2020.01)

(52) U.S. Cl.
CPC .......... *G01S 13/867* (2013.01); *G01S 13/931* (2013.01); *B60W 2050/021* (2013.01); *B60W 2050/0215* (2013.01)

(56) References Cited

U.S. PATENT DOCUMENTS

| | | |
|---|---|---|
| 9,292,409 B2 | 3/2016 | Hammerschmidt et al. |
| 11,091,169 B2 | 8/2021 | Druml |
| 2012/0290169 A1 | 11/2012 | Zeng et al. |
| 2013/0238166 A1 | 9/2013 | Breu et al. |
| 2015/0377945 A1 | 12/2015 | Schlipf et al. |
| 2017/0169627 A1* | 6/2017 | Kim ...................... G01S 13/862 |
| 2017/0293816 A1 | 10/2017 | Micks et al. |
| 2018/0137008 A1 | 5/2018 | Maeda et al. |
| 2019/0162829 A1* | 5/2019 | Konrad .................. G01S 7/497 |
| 2019/0182136 A1 | 6/2019 | Tamm et al. |
| 2019/0236862 A1 | 8/2019 | Mercep et al. |
| 2020/0034354 A1* | 1/2020 | Horita ................. G06F 16/2455 |
| 2020/0151655 A1* | 5/2020 | Khoche .............. G06K 19/0723 |
| 2021/0181326 A1* | 6/2021 | Kurvathodil ............ H01L 23/66 |
| 2022/0206117 A1* | 6/2022 | Qiu ........................... G06T 7/20 |

\* cited by examiner

ADVANCED DRIVER ASSISTANCE SYSTEMS TEST-INTERFACE FOR AUTOMATED DRIVING SENSORS

CROSS-REFERENCE TO RELATED APPLICATIONS

This application is a continuation of U.S. patent application Ser. No. 15/934,041 filed Mar. 23, 2018, which is incorporated by reference as if fully set forth.

FIELD

The present disclosure relates generally to advanced driver assistance systems (ADAS) devices, systems, and methods, and, more particularly, to an ADAS test interface.

BACKGROUND

Advanced driver assistance systems (ADAS) are systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate Global Positioning System (GPS)/traffic warnings, connect to smartphones, alert driver to other cars or dangers, keep the driver in the correct lane, or show what is in blind spots.

ADAS may rely on inputs from multiple data sources, including automotive imaging, Light Detection and Ranging (LiDAR), radar, image processing, computer vision, and in-car networking. Additional inputs are possible from other sources separate from the primary vehicle platform, such as other vehicles, referred to as vehicle-to-vehicle (V2V), or Vehicle-to-Infrastructure systems.

An increasing number of modern vehicles have ADAS such as electronic stability control, anti-lock brakes, lane departure warning, adaptive cruise control, and traction control. These systems can be affected by mechanical alignment adjustments, component errors, and system errors. Thus, there is an increasing need for ADAS test benches to enable optimized testing and failure detection of complex ADAS systems. However, available sensors currently do not provide ADAS specific test interfaces that improve and optimize ADAS test-bench test-runs.

SUMMARY

Embodiments provide an object sensor test system that includes a sensor and a test bench. The sensor includes a receiver configured to receive a reflected signal and a processing chain that includes a plurality of processing components configured to process at least one measurement signal generated in response to the reflected signal. The sensor further includes a first test interface configured to receive test data and at least one control signal, selectively inject the test data into a selected input of a plurality of inputs in the processing chain based on the at least one control signal, and selectively extract processed test data at a selected output of the plurality of outputs in the processing chain based on the at least one control signal, where the selected output is downstream from the selected input in the processing chain. The test bench includes a second test interface configured to communicate with the first test interface, the test bench configured to transmit the test data and the at least one control signal to the first test interface, receive the processed test data from the sensor, compare the received processed test data with expected data to generate a comparison result, and determine that a segment of the processing chain is operating normally or abnormally based on the comparison result.

Embodiments further provide a method of testing an object sensor that includes a processing chain that includes a plurality of processing components configured to process at least one measurement signal generated in response to a reflected signal. The method includes transmitting test data and at least one control signal to the object sensor; selectively injecting the test data into a selected input of a plurality of inputs in the processing chain based on the at least one control signal; selectively extracting processed test data at a selected output of the plurality of outputs in the processing chain based on the at least one control signal, wherein the selected output is downstream from the selected input in the processing chain; comparing the processed test data with expected data to generate a comparison result; and determining that a segment of the processing chain is operating normally or abnormally based on the comparison result.

Embodiments further provide an object sensor that includes a receiver configured to receive a reflected signal and generate at least one measurement signal based on the received reflected signal; a processing chain that includes a plurality of processing components configured to process the at least one measurement signal; and a test interface configured to receive test data and at least one control signal, selectively inject the test data into a selected input of a plurality of inputs in the processing chain based on the at least one control signal, and output processed test data at an output of the processing chain, the processed test data being derived from the test data.

BRIEF DESCRIPTION OF THE DRAWINGS

Embodiments are described herein making reference to the appended drawings.

DETAILED DESCRIPTION

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to sensors and sensor systems and to obtaining information about sensors and sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. As used herein, IR radiation may also be referred to as IR light.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

More specifically, the embodiments related to a three-dimensional (3D) image sensor configured to determine a depth (i.e., a distance) from a depth camera, or more specifically from a pixel array, to an object using a time-of-flight (ToF) principle. In general, light is transmitted from the depth camera and is reflected back by the object. The reflected light is received by a pixel array, where, on a pixel-by-pixel basis, the reflected light is demodulated during an image acquisition to generate a measurement signal. Each pixel may be also configured to perform multiple image acquisitions at different acquisition times, and thereby generate multiple measurement signals therefrom.

It will be appreciated that the underlying principles disclosed herein are applicable to both LiDAR and radar systems.

Figure 1:
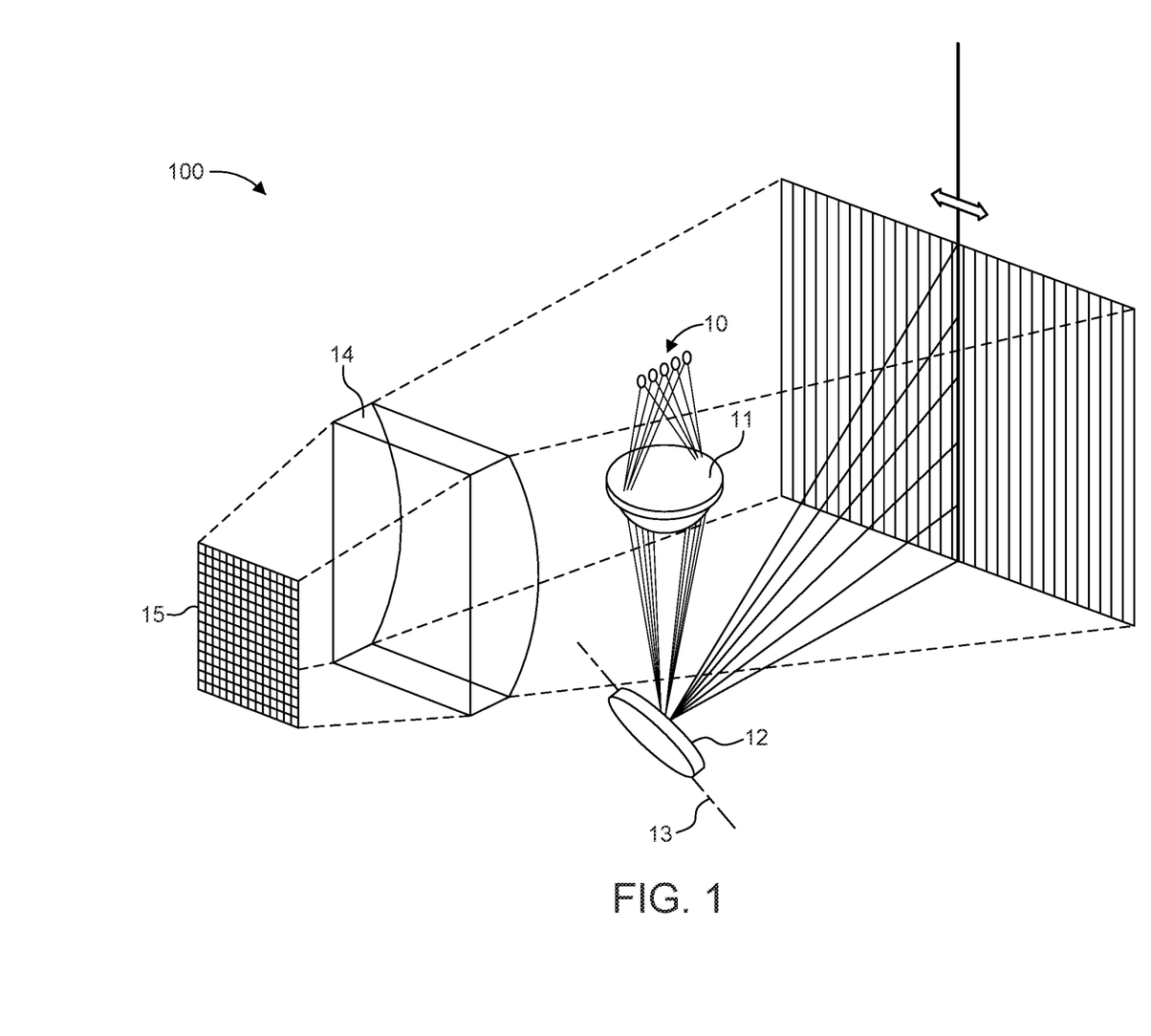
FIG. 1 illustrates a Light Detection and Ranging (LiDAR) scanning system in accordance with one or more embodiments.

FIG. 1 illustrates a Light Detection and Ranging (LiDAR) scanning system 100 in accordance with one or more embodiments. The LiDAR scanning system 100 includes a transmitter, including laser sources 10, a first optical component 11 and a one-dimensional (1D) MEMS mirror 12, and a receiver, including a second optical component 14 and a two-dimensional (2D) detector array 15.

The laser sources 10 are linearly aligned in single bar formation and are configured to transmit light used for scanning an object. The light transmitted from the laser sources 10 are directed towards the first optical component 11 configured to focus each laser onto a one-dimensional MEMS mirror 12. The first optical component 11 may be, for example, a lens. When reflected by the MEMS mirror 12, the light from the laser sources 10 are aligned vertically to form a vertical scanning line. The MEMS mirror 12 is configured to oscillate "side-to-side" about a scanning axis 13 such that the light reflected from the MEMS mirror 12 (i.e., the vertical scanning line) oscillates back and forth in a horizontal scanning direction. The MEMS mirror 12 may be integrated on a MEMS chip (i.e., a MEMS device) which may be assembled in a chip package, to be further described below.

Upon impinging one or more objects, the transmitted light is reflected back towards the LiDAR scanning system 100 where the second optical component 14 (e.g., a lens) receives the reflected light. The second optical component 14 directs the reflected light onto the detector array 15 that is configured to generate measurement signals used for generating a 3D map of the environment and/or other object data based on the reflected light (e.g., via TOF calculations and processing). For example, the detector array 15 may be a pixel array of photodiodes or other light detection components capable of detecting and measuring light, and generating electric signals therefrom. The detector array 15, as used herein, may also be referred to as a receiver that is configured to receive a reflected signal from at least one object in an environment and generate at least one measurement signal in response to the reflected signal.

In particular, during an integration phase of an image acquisition, each optically active pixel of the detector array 15 performs active demodulation on the reflected light signal and generates pixels values (i.e., stored charges) based on the received light signal.

During a data readout phase of an image acquisition, the pixel values (i.e., the stored charges) are readout from the pixels as data (e.g., a measurement signal) and sent to a processing system for further processing. For example, the pixel values may be read out, undergo an analog-to-digital and a time-to-digital conversion performed by first processing components (e.g., an analog-to-digital converter (ADC) and a time-to-digital converter (TDC)) to digital values, and then transferred to one or more further processing components for further processing to derive object and/or scenery information therefrom (e.g., to generate sensor output data, such as point cloud data, object data, tracked object data, ADAS data, etc.). The ADC, the TDC, and the further processing components make up one or more processing chains for processing the measurement signals and generating output sensor data.

Figure 2:
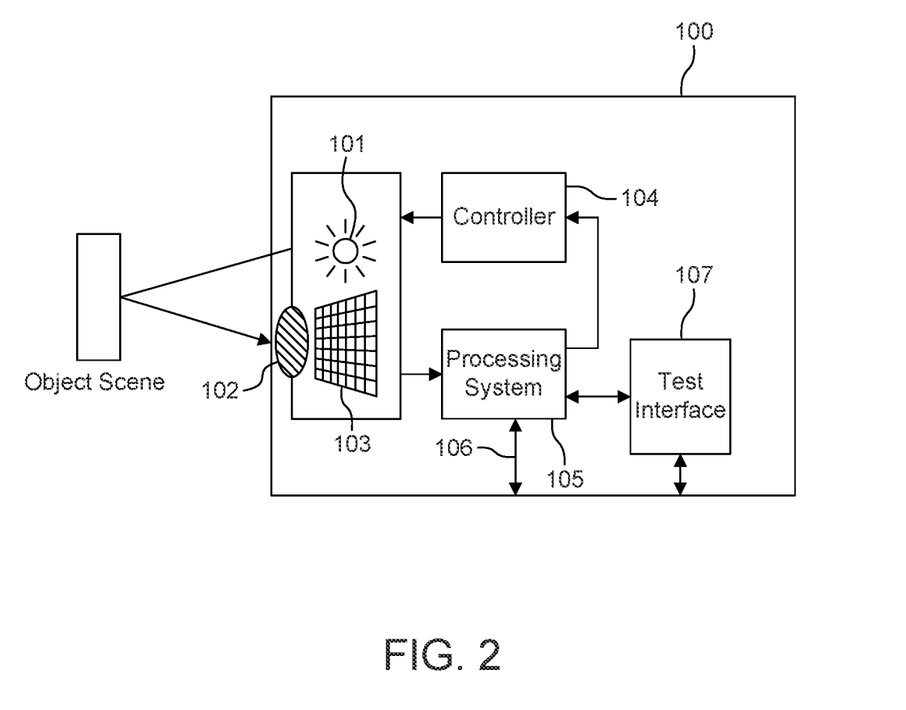
FIG. 2 shows a schematic illustration of an LiDAR sensor according to one or more embodiments.

FIG. 2 shows a schematic illustration of a LiDAR sensor 100 according to one or more embodiments. The LiDAR sensor 100 may be used in advanced driver assistance systems (ADAS) and includes an illumination unit 101 that is an illumination source such as a light emitting diode (LED), a vertical-cavity surface-emitting laser (VCSEL) configured to emit a modulated light signal based on an illumination modulation signal. The illumination unit 101 is configured to emit the modulated IR light from the LiDAR sensor 100 towards one or more objects or a scenery in the surrounding environment. A MEMS mirror (not shown) is used by the LiDAR sensor 100 to perform a scanning operation with the modulated illumination signal. It will be appreciated that the terms "light signal", "IR light", and "illumination signal" may be used interchangeably herein.

The imaging optics 102, which may be a imaging lens system or objective including one or more lenses or diffractive optical elements, is configured to receive a reflected light signal (i.e., reflected modulated light) that is reflected from the scenery. The reflected light signal is directed by the imaging optics 102 to the pixel array 103.

The pixel array 103 is configured to receive a pixel modulation signal which controls a modulation frequency of the pixels of the pixel array 103. Each pixel is configured to use the pixel modulation signal to demodulate the reflected light signal generate an electrical measurement signal for each image acquisition.

LiDAR is a direct Time-of-Flight system in which light pulses (e.g., laser pulses) are emitted by the illumination unit 101, and the pixel array 103 detects and measures the reflected pulses. Differences in return times and wavelengths for each light pulse can then be used to make digital 3D representations of an environment or to generate other sensor data. For example, the illumination unit 101 may emit a single light pulse, and a TDC may count from the time the light pulse is emitted until a time the reflected light pulse is received at the receiver (i.e., the pixel array 103). The "time-of-flight" of the light pulse is then translated into a distance. By emitting successive light pulses in different directions, an area can be scanned and objects within the area can be detected.

The LiDAR sensor 100 also includes a control unit 104 that includes control circuitry for controlling the illumination unit 101 and the pixel array 103. In particular, the control unit 104 may also communicate with a processing system 105, which may parametrize the LiDAR sensor 100 in order to control one or more aspects of one or more image acquisitions. For example, the illumination source 101 may be triggered by a system application specific integrated circuit (ASIC) that knows the position of a MEMS mirror.

The processing system 105 is configured to receive measurement signals from each pixel (e.g., a plurality of measurement signals from each pixel) and perform one or more signal processing operations thereon. Under a typical mode of operation for the LiDAR sensor 100, laser light is emitted, the time dt until it is reflected by an obstacle is measured, and the calculated Time-of-Flight data (e.g., point cloud data) is provided to an electronic control unit (ECU) of a vehicle.

The processing system 105 includes multiple processing stages, each defined by one or more processing components configured to perform signal processing on the measurement signals. Together, multiple processing components define one or more processing chains which may be arranged in series or in parallel to each other. Thus, signal processing operations may be performed in series and/or in parallel based on the desired sensor output data and the processing chains used to generate that desired sensor output data that is output at sensor output 106.

The processing system 105 includes a TDC configured to perform a time to digital conversion of the analog measurement signals received from the pixels to generate digital measurement signals. In particular, a TDC includes one or more counters, performs a time-to-digital conversion using one or more counters for an emitted light pulse, where a counter may be used for each pixel of the pixel array 103. An ADC may be used to obtain a height of a peak of the received light signal for each pixel. It will be appreciated that an ADC and a TDC may comprise a signal processing block or component or separate blocks or components.

Both the analog measurement signals and the digital measurement signals are still in their "raw" form and are regarded as raw measurement data. Thus, "raw measurement data" may refer to either analog or digital measurement data. The digital measurement signals are output from the ADC/TDC to one or more further processing components.

For example, the processing system 105 includes a chain of hierarchical processing components that each generate a further level of processed data. Thus, the processing system 105 is configured to generate a plurality of hierarchical data types based on the level of processing that is desired. Following the conversion to digital measurement signals, the digital measurement signals are processed by digital processing components.

The processing chain includes a series of signal processing and conditioning subcomponents (e.g., logic circuitry, processors, and applications) to perform various functions related to the received reflected light signal.

Logic circuitry may include ADCs and field programmable gate (or logic) arrays (FPGAs), but is not limited thereto. FPGAs contain an array of programmable logic blocks, and a hierarchy of reconfigurable interconnects that allow the blocks to be "wired together", like many logic gates that can be inter-wired in different configurations. Logic blocks can be configured to perform complex combinational functions, or merely simple logic gates like AND and XOR. In some FPGAs, logic blocks also include memory elements, which may be simple flip-flops or more complete blocks of memory.

Processors may include digital signal processors (DSPs) and General-purpose computing on graphics processing units (GPGPUs), but is not limited thereto. A GPGPU is the use of a graphics processing unit (GPU), which typically handles computation only for computer graphics, to perform computation in applications traditionally handled by the central processing unit (CPU).

Applications may be software implemented by processing circuitry to perform various functions related to the received reflected light signal.

One or more processing chains of the processing system 105 may generate different levels of data starting with generating digital measurement signals to one or more of the following: 3D point cloud data, object data, tracked object data, and ADAS sensor data. In addition, one or more processing chains of the processing system 105 may perform one or more of the following functions, including 3D point cloud generation, object detection, object tracking, and adaptive functions such as automated lighting, adaptive cruise control, automated braking, initiate GPS and/or traffic warnings, initiate driver and/or vehicle alerts, lane control, and generate blind spot images.

A 3D point cloud is a set of data points (e.g., georeferenced 3D point data) in some coordinate system. In a three-dimensional coordinate system, these points are usually defined by X, Y, and Z coordinates, and often are intended to represent the external surface of an object or objects. Point clouds may be created by 3D scanners, such as LiDAR and radar image sensors. Thus, a 3D point cloud is a 3D visualization or 3D image data made up of 3D data points collected by a sensor. The 3D point cloud may be referred to as point cloud data and may be used for object detection, object tracking, and, ultimately, for generating ADAS sensor data.

Figure 3:
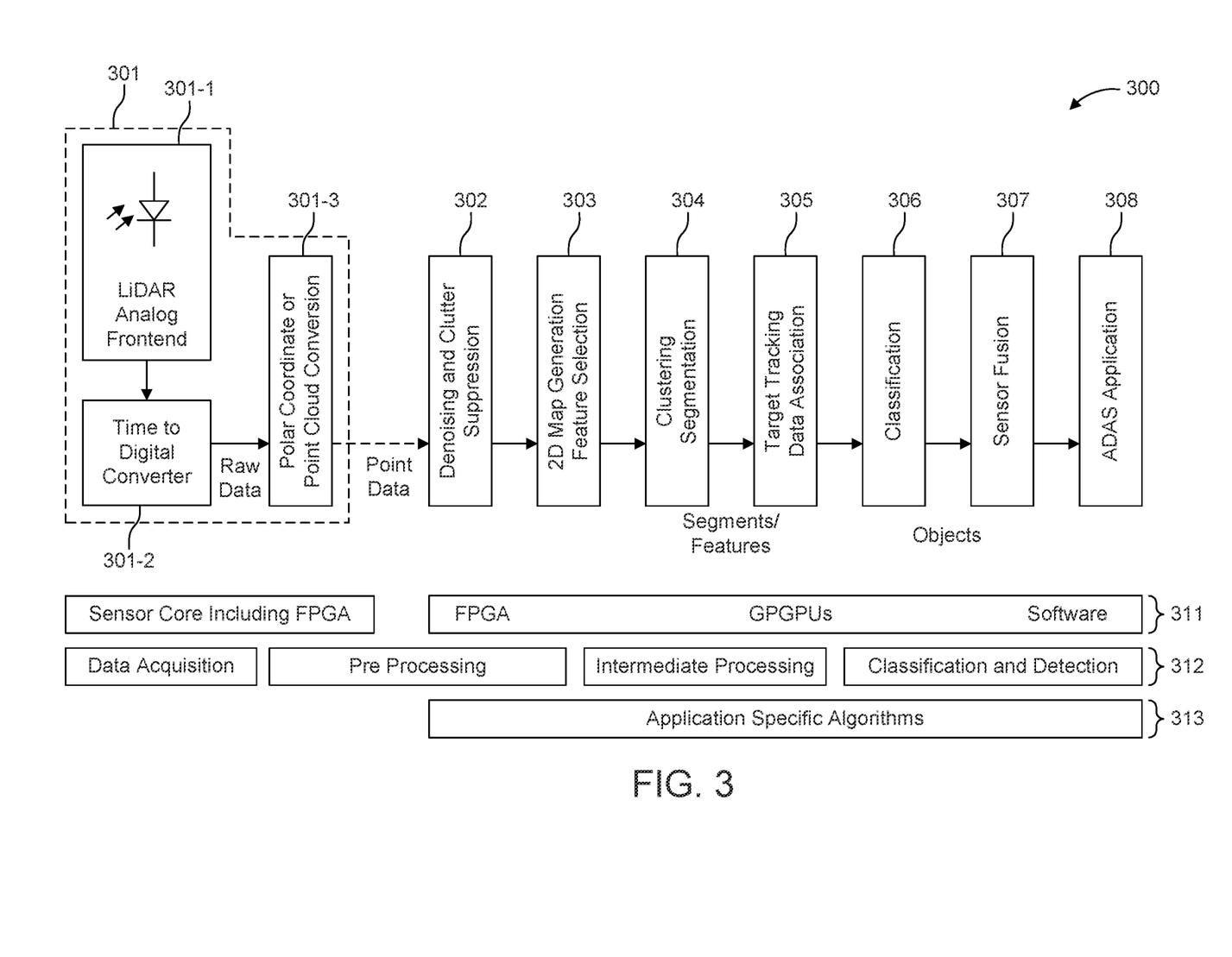
FIG. 3 shows a block diagram of an example processing chain of the LiDAR sensor according to one or more embodiments.

FIG. 3 shows a block diagram of an example processing chain 300 of the LiDAR sensor 100 according to one or more embodiments. The processing chain 300 is represented by a chain of different processing operations that may be performed in sequence. In other examples, two or more processing operations, segments, or chains may be performed in parallel. Neither the processing operations nor the sequence thereof is limited to that shown in FIG. 3. Other processing operations and arrangements are possible. Thus, different processing components are linked together to generate different types of sensor data.

The processing chain 300 includes a sensor core 301, which includes a pixel array 301-1, an ADC&TDC 301-2 (i.e., a time to digital converter) that receives analog raw measurement data and converts it into digital measurement data, and a point data generator 301-3 that processes the digital measurement data and converts the data into polar coordinates and point cloud data. The sensor core 301 then outputs point cloud data from the point data generator 301-3 via a physical connection, such as a Ethernet connection, to the rest of the processing system 105, including processing components 302-308.

It may be appreciated that other processing components may be used in the processing system 105 or in the processing chain 300, including processing components between the time to digital converter 301-2 and the point data generator 301-3. For example, an averaging unit may be provided between the time to digital converter 301-2 and the point data generator 301-3 to average the pixel values for each pixel of the pixel array 301-1.

The processing chain 300 further includes a denoising and clutter suppression unit 302 to, for example, reduce or eliminate snow from the point cloud data.

The processing chain 300 further includes a two-dimensional (2D) map generation and feature selection unit 303 to, for example, map the point cloud data to a 2D coordinate system and to identify features within the point cloud data. The resultant sensor data may be objects/obstacles in this 2D occupancy grid map. Here, the identified features may be used by a further processing component to identify and/or track different objects detected in the environment.

The processing chain 300 further includes a clustering and segmentation unit 304 configured to cluster and segment the identified features into object data, where each feature or cluster of features may be recognized as corresponding to one or more objects. From here, object data may be generated. Object data may include segmented data defines objects to which each cluster of features corresponds to and a range or distance of an object from the sensor 100.

The processing chain 300 further includes a target tracking and data association unit 305 configured to assign each feature and/or object an identifier (ID) that is recognized by the sensor 100. The target tracking and data association unit 305 is configured to generate tracked object data and track each object between different frames or image acquisitions.

The processing chain 300 further includes a classification unit 306 configured to classify an object (i.e., a cluster of features) into object types (e.g., vehicle, pedestrian, sign, building, tree, etc.).

The processing chain 300 further includes a sensor fusion unit 307 configured to combine sensor data with other sensor data. For example, sensor data from the LiDAR sensor 100 may be combined with sensor data generated by a radar sensor and/or a camera.

The processing chain 300 further includes an ADAS application unit 308 configured to generate ADAS sensor data to be used in ADAS applications.

The implementation of one or more processing components may change based on the sensor type and based on the processing operations and the arrangements thereof. However, processing components that receive and/or generate lower level sensor data are more hardware-based, and processing components that receive and/or generate higher level sensor data are more software-based. Thus, a hierarchical order of processing components 311 is shown to correspond to the processing operations of the processing chain 300. For example, processing operations on the left side of the processing chain 300 may be implemented by a FPGA, processing operations in the middle of the processing chain 300 may be implemented by a GPGPU, and processing operations on the right side of the processing chain 300 may be implemented by software on a processor. Thus, a hierarchical order of sensor data exists, which is generated by processing components that are arranged based on the hierarchical order.

In addition, a chain of processing segments 312 is shown to correspond to the processing operations of the processing chain 300 and to the processing components. Each processing segment corresponds to a different processing stage of the LiDAR sensor 100 and may use one or more processing components. For example, the first stage is a data acquisition stage. During the acquisition, a reflected light signal is received and digital measurement data is generated therefrom. Other stages include a pre-processing stage, including processing components 301-3, 302, and 303, an intermediate stage, including processing components 304 and 305, and a classification and detection stage, including processing components 306, 307, and 308.

As further indicated in FIG. 3, processing components 302-308 may use application specific algorithms 313 for generating their corresponding sensor data.

Turning back to FIG. 2, the LiDAR sensor 100 further includes a test interface 107 that is cooperatively coupled to the processing system 105. The test interface is configured to receive test data and at least one control signal from an ADAS test bench, selectively inject the test data into a selected input of a plurality of inputs in the processing chain 300 of the processing system 105 based on the at least one control signal, and selectively extract processed test data at a selected output of the plurality of outputs in the processing chain 300 based on the at least one control signal, where the selected output is downstream from the selected input in the processing chain 300.

The test interface 107 may include a communication interface, such as a Serial Peripheral Interface bus (SPI), to communicate with the ADAS test bench. In addition, the test interface 107 may include multiple multiplexers used to selectively inject test data into the processing chain 300 and extract the processed test data from the processing chain 300.

Figure 4:
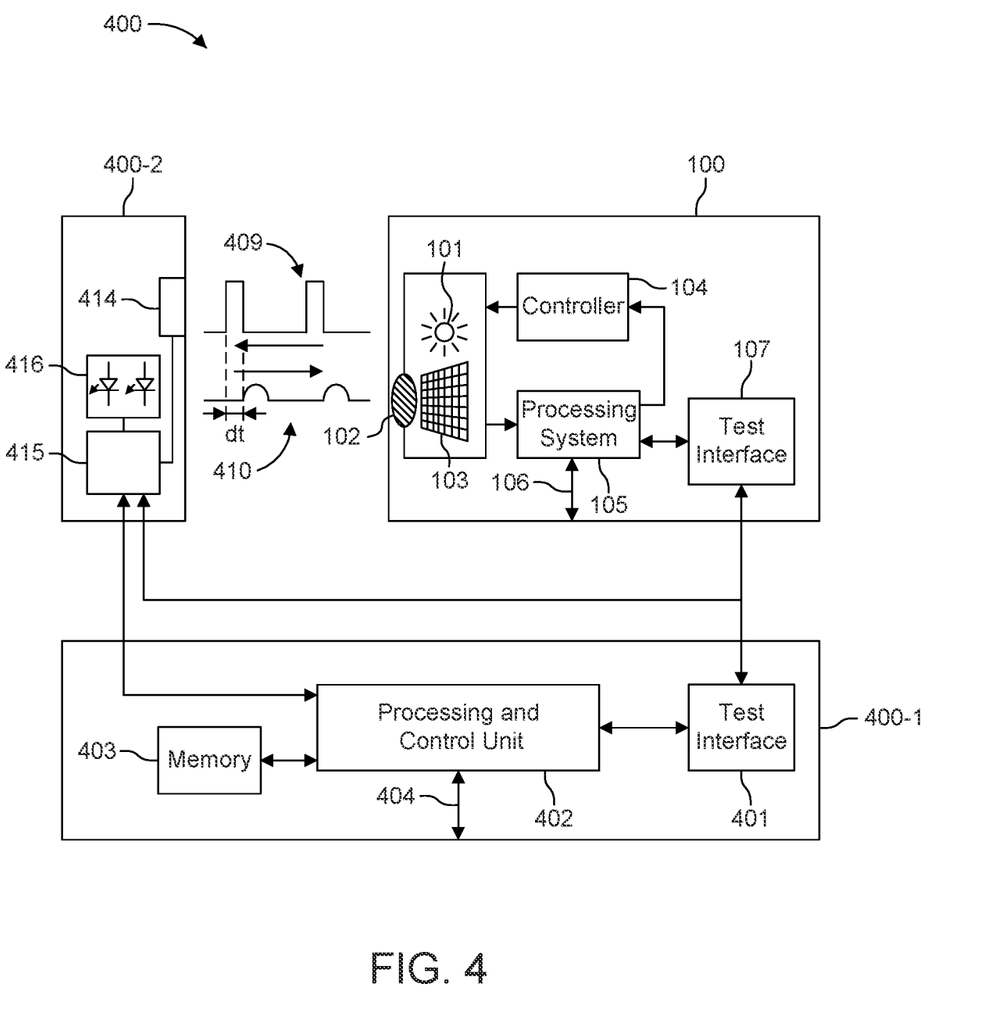
FIG. 4 shows a schematic illustration of an ADAS test system for ToF scanning sensors according to one or more embodiments.

FIG. 4 shows a schematic illustration of an ADAS test system 400 for LiDAR scanning sensors according to one or more embodiments. The ADAS test system includes the LiDAR sensor 100, as provided in FIG. 2, an ADAS test bench 400-1 and an ADAS test bench simulator 400-2.

The ADAS test bench 400-1 provides a dedicated sensor ADAS test system that enables optimized testing and failure detection of ADAS systems. The dedicated ADAS test system is configured for sensors, such as LiDAR sensor 100, which are used in ADAS applications and which are planned to be tested in ADAS test-benches.

In order to improve test-bench test runs and to enable sub-block testing at the sensor and vehicle level, an ADAS test interface 107 is integrated into the sensor 100. This ADAS test interface 107 enables, apart from configuration tasks, data stream bypassing of certain sensor-subcomponents (e.g., processing components). Thus, the sensor's ADAS test interface 107 is configured to bypass all sensor sub-blocks except for the signal processing block 105. In another configuration, the signal processing block 105 may also be bypassed.

By using this ADAS test interface 107 along with the ADAS test bench 400-1, failures within a vehicle's ADAS system can be identified more precisely and components may be exchanged in a cost-efficient manner. For example, individual processing components can be tested by the ADAS test bench 400-1, and the ADAS test bench 400-1 can determine whether a processing component is operating normally or abnormally. A faulty processing component can be identified and alerted to an external device (e.g., a vehicle ECU) and, ultimately, to a user via a bus interface 404, who may repair, debug, or replace the faulty processing component.

Thus, a dedicated ADAS test interface 107 for ADAS sensors, such as LiDAR and Radar, is configured to communicate with the ADAS test bench 400-1 for testing processing segments and processing components of the processing chain of the processing system 105. Its purpose is, apart from configuration tasks, to provide a data bypass interface for receiving certain test-bench data stream (e.g., which represents the virtual scenery) from the ADAS test bench 400-1 and selectively inject or input the test-bench data stream into a point along the processing chain. This injection point is selected by the ADAS test bench 400-1 based on which processing segment and/or processing component to test. Thus, this data stream bypasses certain sensor sub-blocks (e.g., in case of a LiDAR e.g. the illumination source, MEMS mirror, photodiodes, etc.) and directly goes into the signal processing block, a vehicle's ECU, sensor fusion box. The sub-blocks to be bypassed may be configured by the ADAS test bench 400-1. Thus, different types of digital (or even analog) data can be fed by the ADAS test-bench 400-1 into the sensor's ADAS test interface 107.

The ADAS test-bench 400-1 includes an ADAS test interface 401 configured to communicate with the sensor's ADAS test interface 107, a processing and control system 402 configured to transmit control signals and test data to the sensor's ADAS test interface 107 via the ADAS test interface 401, and a memory unit 403 configured to store test data, including different types of test data intended for testing different processing segments and processing components of the processing system 105.

The ADAS test-bench 400-1 is configured to generate virtual scenery data or virtual point cloud data that represent a virtual scenery, or other types of virtual data to be used at test data. As used herein, "virtual" data refers to simulated data generated by a test device to use in a sensor under test, instead of actual data generated by the sensor while use out in the field. The terms "virtual data", "simulated data", and "test data" may be used interchangeably herein.

For example, the ADAS test-bench 400-1 is configured to generate virtual object data which may include an identification or classification of a type (e.g., pedestrian, vehicle, etc.) of virtual object and a virtual range or distance of the virtual object from the sensor 100. In addition, the ADAS test-bench 400-1 is configured to generate virtual tracked object data which may include an assigned ID of a virtual object, and frame data of multiple frames in which the virtual object is tracked from frame to frame using the assigned ID.

The ADAS test-bench 400-1 is also configured to test ADAS functionalities and ADAS responses based on virtual sensor data input into the sensor 100. In particular, the ADAS test-bench 400-1 is configured to test an ADAS algorithm based on the test data. In this instance, the ADAS test-bench 400-1 may compare the tested response with an expected response to determine whether the ADAS algorithm is operating normally or abnormally.

The ADAS test-bench 400-1 is configured to generate the appropriate type of test data based on the processing segments and processing components targeted for testing. In addition or in the alternative, the test data, including different types and multiple variants for the same data type (e.g., different sets of analog raw measurement data, digital raw measurement data, point cloud data, object data, tracked object data, and other processed test data) may be stored in memory unit 403. Thus, the ADAS test-bench 400-1 may be configured to select the type of test data and variant, and select specific test data that meets a rule or criterial for performing a test procedure. The selected or generated test data may then be used for testing the sensor 100 and targeted sub-components thereof.

In addition, the ADAS test-bench 400-1 is configured to select an output of the processing chain from which test data is to be extracted from the processing system 105 based on an output of a targeted processing segment or processing component under test. Based on the extraction point (output) of the processing system 105, the ADAS test-bench 400-1 is configured to determine the expected data that should be generated by the targeted portion of the processing system 105 based on the injected test data and the processing component(s) through which the injected test data is processed to the point of extraction. Based on this determination of expected data, the ADAS test-bench 400-1 may either generate the expected data or select the expected data from data stored in memory unit 203, and use the expected data to compare with the received processed test data to generate a comparison result.

The ADAS test system 400 may also include an ADAS test bench simulator 400-2 which may be configured to receive point cloud data of a virtual scene from the ADAS test-bench 400-1. In particular, the ADAS test bench simulator 400-2 includes a detector 414 configured to detect an optical signal 409 generated by the illumination source 101 of the LiDAR sensor 100. However, instead of the optical signal 409 being reflected back at the LiDAR sensor 100, the LiDAR's emitted light is absorbed or deflected by the ADAS test bench simulator 400-2.

Instead, in response to the detector 414 detecting the optical signal 409, the processing and control unit 415 triggers the ADAS test bench simulator 400-2 to emit a light signal pattern (i.e., a simulated optical signal 410) from laser matrix 416 which correlates to the virtual scenery provided to the ADAS test bench simulator 400-2 by the ADAS test-bench 400-1. That is, the ADAS test bench simulator 400-2 generates and emits a simulated "reflected" light signal having a reflection signature of a simulated object scene.

The LiDAR sensor 100 receives this simulated optical signal 410 at its pixel array 103, and calculates point cloud data information (or other sensor data) which, in best case, equals the virtual scenery. The point cloud data or other sensor data is output from the sensor 100 via the test interface 107 to the ADAS test-bench 400-1, and difference between virtual scene and the LiDAR's sensed scene is then assessed by the processing and control system 402 of ADAS test-bench 400-1 to determine whether the LiDAR sensor 100 is operating normally (i.e., correctly) within expected parameters (i.e., whether processed test data matches expected data). If the processing and control system 402 determines that the LiDAR sensor 100 is operating abnormally, it initiates sub-block testing of the processing system 105 to determine whether a processing segment or processing component thereof is faulty. It will also be appreciated that sub-block testing may be initiated by a user or an external device via bus interface 404 without the use of the ADAS test bench simulator 400-2.

Under sub-block testing, the ADAS test-bench 400-1 uses the test interface 401, which may be an SPI bus interface, to communicate with test interface 107. Specifically, the processing and control system 402, including at least one processor and a controller, transmits the test data and one or more control signals to the test interface 107 via the test interface 401. The processing and control system 402 then receives processed test data, processed by one or more processing components of the processing system 105, from the test interface 107 based on the input test data. Upon receiving the processed test data, the processing and control system 402 compares the received processed test data with expected data to generate a comparison result, and determines whether a segment or processing component of the processing chain of the processing system 105 is operating normally or abnormally based on the comparison result (e.g., based on whether the processed test data matches the expected data).

One or more control signals may be generated by the processing and control system 402 to provide control information to the test interface 107 of the sensor 100. In particular, the control information controls to which input in the processing chain test data in input, and from which output in the processing chain processed test data is to be extracted. Thus, the test interface 107 is configured to receive test data and at least one control signal, selectively inject the test data into a selected input of a plurality of inputs in the processing chain based on the at least one control signal, and selectively extract processed test data at a selected output of the plurality of outputs in the processing chain based on the at least one control signal, where the selected output is downstream from the selected input in the processing chain.

In one example, the ADAS test-bench 400-1 generates or selects from memory unit 403 3D point cloud data that represents a 3D object scene and injects the 3D point cloud into a point in the processing chain of the sensor 100, bypassing the sensor photodiodes (pixels). As noted above, different entry points in the processing chain may be selected based on the type of injected data and/or the processing component or components selected to be under test. Additionally, the injected data (test data) may be generated based on the processing component or components selected to be under test or selected from a stored pool of test data stored in memory unit 203 based on the processing component or components selected to be under test.

Figure 5:
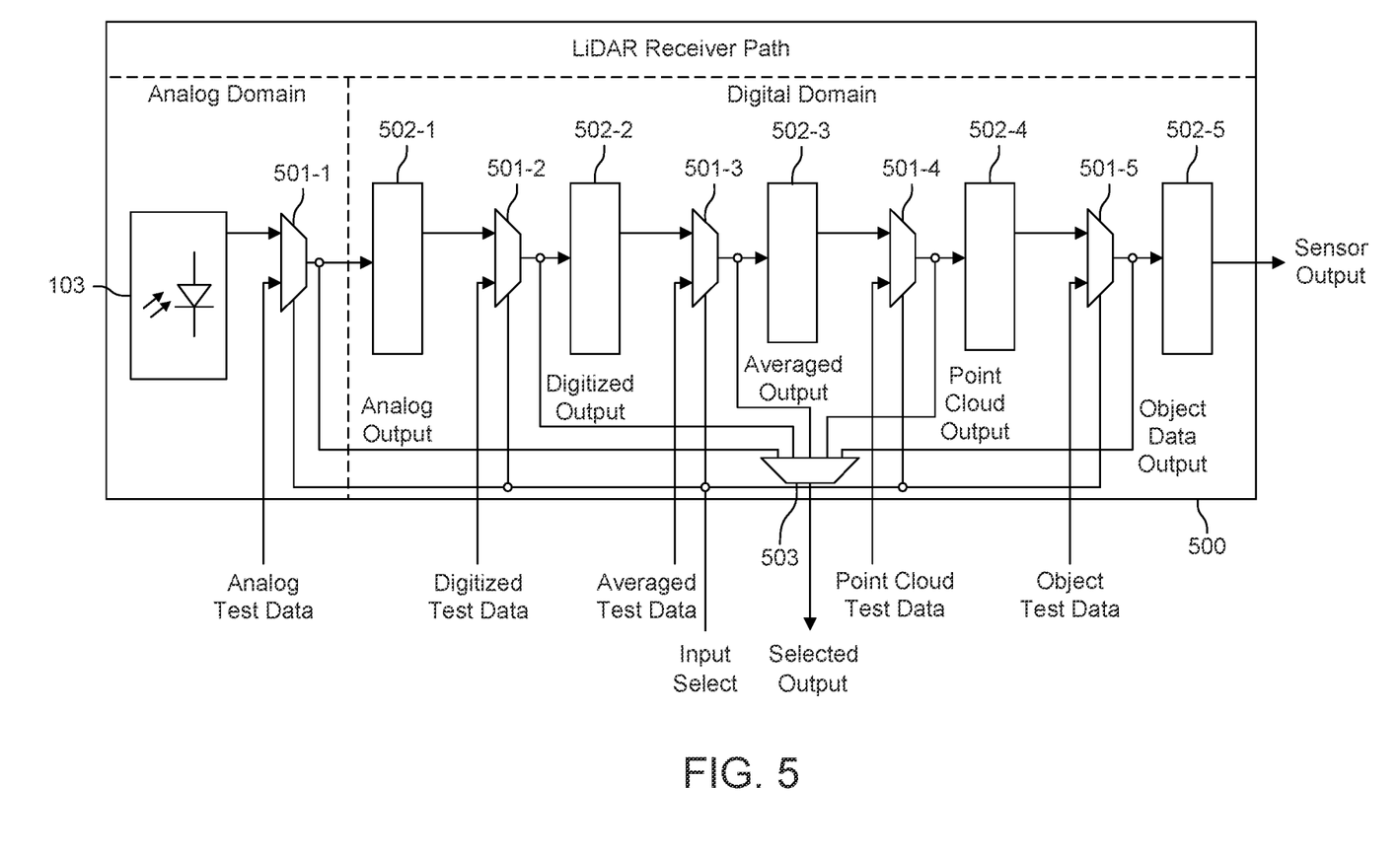
FIG. 5. shows a schematic illustration of LiDAR receiver data path with a processing chain integrated with a test interface according to one or more embodiments.

FIG. 5. shows a schematic illustration of LiDAR receiver data path 500 with a processing chain integrated with a test interface according to one or more embodiments. As noted above, a test interface 107 of a sensor may include multiple multiplexers used to selectively inject test data into a processing chain and extract the processed test data from the processing chain.

For example, input multiplexers 501-1, 501-2, 501-3, 501-4, 501-5, etc., may be configured to control, based on a control signal received from the ADAS test bench, a processing component having a selected input to receive the test data and disable an input corresponding to a data path originating at the receiver (i.e., originating at the pixel array 103). An input multiplexer may be provided at input of each processing component of the processing system of the sensor. For example, the processing chain shown in FIG. 5 includes various processing components, including an ADC 502-1, an averaging unit 502-2, a point cloud generation unit 502-3, an object detection unit 502-4, and a further processing component 502-5. Input multiplexer 501-1 is configured to receive analog data (e.g., raw measurement data), whereas the remaining input multiplexers 501-2, 501-3, 501-4, 501-5 are configured to receive digital data.

Each input multiplexer has two data inputs that can be enabled or disabled in a complimentary manner. Thus, each input multiplexer is configured to control a data path of a respective processing component based on an input select control signal received from the ADAS test bench such that the data is either received from a data path originating from a previous processing component or the sensor receiver, or from a data path origination from the test interface. The data path from a previous processing component may be regarded as a data path originating at the receiver.

Therefore, an input multiplexer enables a first one of the two data paths and disables a second one of the two data paths in a complimentary manner based on the input select control signal. The number of input multiplexers may vary depending on the number of processing components in a processing chain or in the processing system of the sensor.

In addition, an output multiplexer 503 may be configured to receive, based on an output select control signal it receives from the ADAS test bench, processed test data from a processing component having a selected output and transmit the processed test data to the ADAS test bench.

In this example, the ADC 502-1 is configured to receive analog raw measurement data and output digital raw measurement data. Based on the selected input indicated in the input select control signal, the ADC 502-1 will either receive analog data from the pixel array 103 or analog test data from the ADAS test bench. Furthermore, if the output of the ADC 502-1 is indicated in the output select control signal, the output multiplexer 503 will receive the digital raw measurement data as the processed test data and transmit the same to the ADAS test bench for analysis.

The averaging unit 502-2 is configured to receive digital raw measurement data and output averaged data. Based on the selected input indicated in the input select control signal, the averaging unit 502-2 will either receive digital raw measurement data from the ADC 502-1 or digital raw measurement test data from the ADAS test bench. Furthermore, if the output of the averaging unit 502-2 is indicated in the output select control signal, the output multiplexer 503 will receive the averaged data as the processed test data and transmit the same to the ADAS test bench for analysis.

The point cloud generation unit 502-3 is configured to receive averaged data and output point cloud data. Based on the selected input indicated in the input select control signal, the point cloud generation unit 502-3 will either receive averaged data from the averaging unit 502-2 or averaged test data from the ADAS test bench. Furthermore, if the output of the point cloud generation unit 502-3 is indicated in the output select control signal, the output multiplexer 503 will receive the point cloud data as the processed test data and transmit the same to the ADAS test bench for analysis.

The object detection unit 502-4 is configured to receive point cloud data and output object data. Based on the selected input indicated in the input select control signal, the object detection unit 502-4 will either receive point cloud data from the point cloud generation unit 502-3 or point cloud test data from the ADAS test bench. Furthermore, if the output of the object detection unit 502-4 is indicated in the output select control signal, the output multiplexer 503 will receive the object data as the processed test data and transmit the same to the ADAS test bench for analysis.

The further processing component 502-5 is configured to receive object data and output further processed data (e.g., tracked object data, ADAS data, etc.). The further processing component 502-5 may be any additional processing component used in the processing system, and additional further processing components may also be added to the processing system. Based on the selected input indicated in the input select control signal, the further processing component 502-5 will either receive object data from the object detection unit 502-4 or object data from the ADAS test bench. Furthermore, if the output of the further processing component 502-5 is indicated in the output select control signal, the output multiplexer 503 will receive the further processed data as the processed test data and transmit the same to the ADAS test bench for analysis.

The ADAS test bench 400-1 is configured to select an input among the plurality of inputs of the processing system 105 according to a rule and select an output among the plurality of outputs of the processing system 105 according to the rule, and identify a faulty processing component of the plurality of processing components based on the selection of the input and the output. The rule may be a testing algorithm that is configured to locate faulty processing components.

The rule may define a test to be performed sequentially along a processing chain from low-level processing components to high-level processing components (i.e., downstream) or vice versa (i.e., upstream). Thus, the ADAS test bench 400-1 may initially target a first processing component of a processing chain and sequentially test processing components downstream to the last processing component of a processing chain. Alternatively, the ADAS test bench 400-1 may initially target a last processing component of a processing chain and sequentially test processing components upstream to the first processing component of a processing chain. The rule may define a start point and an end point for the test, which may be intermediary points along a processing chain or in the processing system.

The rule may alternatively utilize a divide-and-conquer strategy in which testing starts at a mid-point or other intermediary point in a processing chain, and move upstream and/or downstream from that starting point. One or more processing segments may be tested one at a time, or in parallel.

Other rules may also be implemented based on one or more test strategies, and is not limited to the above examples. In addition, multiple processing chains of a sensor processing system may be tested in series or in parallel. Different processing chains may be located on the same or different chips. Therefore, an ADAS test bench may be configured to multiplex within a single chip or between chips.

In view of the above, an ADAS test bench may compare received processed test data with expected data, and determine whether the processed test data matches the expected data or is within an acceptable tolerance range of the expected data. If not, the ADAS test bench may continue to trouble shoot different processing components by injecting different levels of data at different respective injection points in the processing chain to identify a faulty component. This can be done serially or in parallel to optimize the test system.

The ADAS test bench may provide low-level test data, including analog electrical measurement signals (if injecting upstream to the ADC) or digital electrical measurement signals (if injecting downstream to the ADC) that are representative of electrical measurement signals generated by photodiodes via demodulating a reflected optical signal. A level of data extraction increases as data moves further downstream in a processing chain. For example, a hierarchy of data from low-level to high-level may proceed as follows: photodiode data, distance data, point cloud data, 2D map data, segment and feature data, object data, tracked object data, sensor fusion data, ADAS data, etc. Thus, signal processing devices and algorithms implemented therein (e.g., a component or an algorithm may become corrupted or faulty) on a sub-block basis.

Accordingly, different levels of test data can be injected into different segments of a processing chain, respectively, and different levels of processed test data can be extracted at the end of each segment or at the end of the processing chain and compared to expected results. Once an error is detected, segment of processing chain that contains an error can be detected and repaired. A segment may include one or more processing components and/or algorithms. In addition, automated driving algorithms may be tested under various driving conditions, and the results monitored to determine if responses are as expected. For example, an ADAS application response can be measured or monitored under an injected test condition to determine whether each algorithm is operating within an acceptable tolerance.

Figure 6:
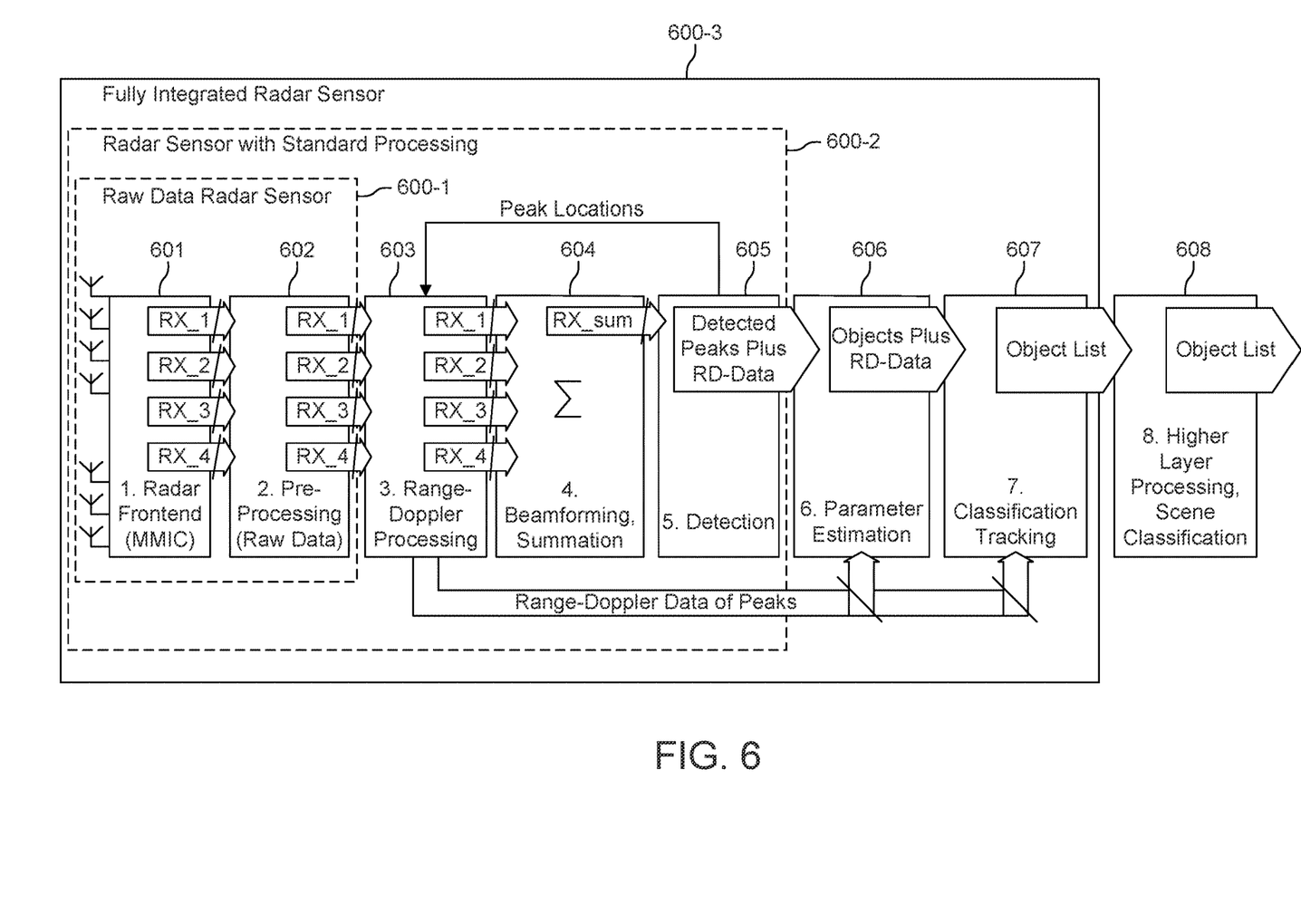
FIG. 6 shows block diagram of a radar processing chain according to one or more embodiments.

While the above examples demonstrate an ADAS test system for LiDAR sensors, the principles herein may be extended to other types of ADAS sensors, such as radar sensors. FIG. 6 shows schematic block diagram of a radar processing chain 600 according to one or more embodiments. The radar processing chain 600 includes various processing components 601-608 arranged on different chip levels 600-1, 600-2, and 600-3. The processing components may include radar front end 601 (e.g., a Monolithic Microwave Integrated Circuit (MMIC), a pre-processing unit 602, a range-doppler processing unit 603, a beamforming summation unit 604, a detection unit 605, a parameter estimation unit 606, a classification and tracking unit 607, and a higher layer processing unit 608 (e.g., scene classification unit).

Specifically, processing components may be provided in a raw data radar sensor 600-1 while other processing components may be provided on another chip. Alternatively, processing components may be provided in a radar sensor 600-2 that includes standard processing while other processing components may be provided on another chip. Alternatively, processing components may be provided in a fully integrated radar sensor 600-3 that includes advanced processing while other processing components may be provided on another chip or other device.

Similar to the LiDAR sensor 100, radar sensor may include an ADAS test interface to inject test data at one of the various points along the radar processing chain and to extract processed test data from a processing component to transmit to an ADAS test bench by way of multiple multiplexers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a computer readable, digital storage medium, for example a floppy disk, a DVD, a Blue-Ray, a CD, a RAM, a ROM, a PROM, an EPROM, an EEPROM or a FLASH memory, having electronically readable control signals stored thereon, which cooperate (or are capable of cooperating) with a programmable computer system such that the respective method is performed.

Instructions may be executed by one or more processors, such as one or more central processing units (CPU), digital signal processors (DSPs), general purpose microprocessors, application specific integrated circuits (ASICs), field programmable gate (or logic) arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. An object sensor test system comprising:
   a sensor comprising a receiver configured to receive a simulated optical signal and a processing chain that includes a plurality of processing components configured to process at least one measurement signal generated in response to the simulated optical signal to generate processed test data,
   the sensor further comprising a first test interface configured to receive a control signal indicating a selected output from a plurality of outputs in the processing chain and selectively extract the processed test data at the selected output based on the control signal; and
   a test bench comprising a second test interface configured to communicate with the first test interface, the test bench configured to transmit the control signal to the first test interface, receive the processed test data from the sensor, compare the received processed test data with expected data to generate a comparison result, and determine that a segment of the processing chain is operating normally or abnormally based on the comparison result.

2. The object sensor test system of claim 1, further comprising:
   a simulator configured to generate and transmit the simulated optical signal,
   wherein the test bench is configured to generate a test signal that includes data of a virtual scene and the simulator is configured to generate the simulated optical signal representative of the virtual scene based on the test signal.

3. The object sensor test system of claim 2, wherein the expected data corresponds to the virtual scene.

4. The object sensor test system of claim 1, wherein each of the plurality of processing components includes a respective output of the plurality of outputs in the processing chain.

5. The object sensor test system of claim 1, wherein the segment of the processing chain corresponds to one or more processing components of the plurality of processing components located between the receiver and the selected output.

6. The object sensor test system of claim 2, wherein the test bench is configured to select the selected output based on one or more processing components of the plurality of processing components selected for testing, and select or generate the test signal to transmit to the simulator based on the selected output.

7. The object sensor test system of claim 2, wherein the test bench is configured to select the selected output, and select or generate the expected data based on the data of the virtual scene and the selected output.

8. The object sensor test system of claim 1, wherein the sensor is a Light Detection and Ranging (LiDAR) sensor, and the processing chain is configured to generate a sensor output data based on the at least one measurement signal.

9. The object sensor test system of claim 1, wherein the test bench is an advanced driver assistance systems (ADAS) test bench configured to test an ADAS algorithm triggered in response to the simulated optical signal.

10. The object sensor test system of claim 1, wherein the first test interface includes at least one multiplexer configured to receive, based on the control signal, the processed test data from a processing component having the selected output and transmit the processed test data to the test bench.

11. The object sensor test system of claim 1, wherein the test bench is configured to select an output among the plurality of outputs along the processing chain according to a rule, and identify a faulty processing component of the plurality of processing components based on a selection of the output.

12. The object sensing test system of claim 11, wherein the test bench is configured to select the expected data from a plurality of hierarchical data types based on the selection of the output according to the rule.

13. The object sensing test system of claim 11, further comprising:
   a simulator configured to generate and transmit the simulated optical signal,
   wherein the test bench is configured to generate a test signal that includes data of a virtual scene and the simulator is configured to generate the simulated optical signal representative of the virtual scene based on the test signal, and
   wherein the test bench is configured to select the data of the virtual scene from a plurality of hierarchical data types based on the selection of the output according to the rule.

14. A method of testing an object sensor comprising a processing chain that includes a plurality of processing components configured to process at least one measurement signal generated in response to a reflected signal, the method comprising:
   transmitting a control signal to a test interface of the object sensor, the control signal indicating a selected output from a plurality of outputs in the processing chain;
   transmitting a simulated optical signal to a receiver of the object sensor;
   generating electrical signals as test data by the receiver in response to the simulated optical signal;
   processing the electrical signals by a processing chain of the object sensor to generate processed test data;
   selectively extracting the processed test data at the selected output of the plurality of outputs in the processing chain based on the control signal, wherein the selected output is downstream from the receiver in the processing chain;
   comparing the processed test data with expected data to generate a comparison result; and determining that a segment of the processing chain is operating normally or abnormally based on the comparison result.

15. The method of claim 14, wherein the simulated optical signal is representative of a virtual scene.

16. The method of claim 15, wherein the expected data corresponds to the virtual scene.

17. The method of claim 14, further comprising:
selecting the selected output among the plurality of outputs according to a rule; and
identifying a faulty processing component among the plurality of processing components based on the selected output and the comparison result.

18. An object sensor, comprising:
a receiver configured to receive a simulated optical signal and generate at least one measurement signal based on the received simulated optical signal;
a processing chain that includes a plurality of processing components configured to process the at least one measurement signal to generate processed test data, wherein each of the plurality of processing components includes a respective output of a plurality of outputs in the processing chain; and
a test interface configured to receive a control signal indicating a selected output among the plurality of outputs and selectively output the processed test data from the processing chain at the selected output of the processing chain.

19. The object sensor of claim 18, wherein the object sensor is a Light Detection and Ranging (LiDAR) sensor, and the processing chain is configured to generate sensor data based on the at least one measurement signal.

20. The object sensor of claim 18, wherein the test interface includes at least one multiplexer configured to receive the control signal and extract the processed test data from the selected output of the processing chain.

21. An object sensor test system comprising:
a sensor comprising a receiver configured to receive a simulated optical signal and generate at least one measurement signal representative of the simulated optical signal, and a processing chain that includes a plurality of processing components configured to process the at least one measurement signal generated in response to the simulated optical signal to generate processed test data corresponding to the simulated optical signal,
wherein the processing chain comprises a plurality of outputs,
wherein each output is configured to output respective processed test data from the processing chain, wherein the respective processed test data corresponds to one or more processing components located upstream from the output in the processing chain, and
wherein the sensor further comprises a first test interface configured to receive a control signal indicating a selected output from the plurality of outputs in the processing chain and selectively extract the respective processed test data at the selected output based on the control signal, wherein the first test interface is separately coupled to each output of the plurality of outputs by a respective signal line for receiving the respective processed test data; and
a test bench comprising a second test interface configured to communicate with the first test interface, the test bench configured to transmit the control signal to the first test interface, receive the respective processed test data from the sensor, compare the respective processed test data with expected data to generate a comparison result, and determine that a segment of the processing chain is operating normally or abnormally based on the comparison result.

* * * * *